(12) United States Patent
McGary et al.

(10) Patent No.: US 10,397,388 B2
(45) Date of Patent: Aug. 27, 2019

(54) EXTENDED FEATURES FOR NETWORK COMMUNICATION

(71) Applicant: Hand Held Products, Inc., Fort Mill, SC (US)

(72) Inventors: Dale McGary, Pittsburgh, PA (US); George Joshue Karabin, Pittsburgh, PA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 14/929,599

(22) Filed: Nov. 2, 2015

(65) Prior Publication Data

US 2017/0126873 A1    May 4, 2017

(51) Int. Cl.
| | | |
|---|---|---|
| H04M 1/60 | (2006.01) | |
| H04M 1/725 | (2006.01) | |
| H04W 4/80 | (2018.01) | |
| H04W 84/18 | (2009.01) | |

(52) U.S. Cl.
CPC ....... *H04M 1/6066* (2013.01); *H04M 1/6058* (2013.01); *H04M 1/7253* (2013.01); *H04M 1/72522* (2013.01); *H04W 4/80* (2018.02); *H04W 84/18* (2013.01)

(58) Field of Classification Search
CPC ............. H04M 1/6066; H04M 1/7253; H04M 1/72522; H04M 1/72527; H04M 1/72569; H04M 1/72533; H04M 1/7255; H04M 1/72563; H04W 4/008; H04W 72/0453
See application file for complete search history.

(56) References Cited

U.S. PATENT DOCUMENTS

| | | | |
|---|---|---|---|
| 6,832,725 B2 | 12/2004 | Gardiner et al. | |
| 7,128,266 B2 | 10/2006 | Marlton et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Suzhou et al. | |
| 8,346,168 B2* | 1/2013 | Chae .................. | H04M 1/7253 455/41.2 |

(Continued)

FOREIGN PATENT DOCUMENTS

| | | |
|---|---|---|
| WO | 2013163789 A1 | 11/2013 |
| WO | 2013173985 A1 | 11/2013 |
| WO | 2014019130 A1 | 2/2014 |
| WO | 2014110495 A1 | 7/2014 |

OTHER PUBLICATIONS

U.S. Appl. No. 14/715,916 for Evaluating Image Values filed May 19, 2015 (Ackley); 60 pages.

(Continued)

*Primary Examiner* — Magdi Elhag
(74) *Attorney, Agent, or Firm* — Additon, Higgins & Pendleton, P.A.

(57) ABSTRACT

A network for communicating an exchange of data signals between multiple entities is described. The network has two or more channels. A first channel of the network is operable for exchanging a first portion of the data signals, based on a communication profile, between a first entity and one or more entities communicatively coupled with the first entity. At least a second channel of the network is operable for exchanging a second portion of the data signals, independent of the communication profile, between the first entity and at least one of the one or more entities.

13 Claims, 3 Drawing Sheets

(56) References Cited

U.S. PATENT DOCUMENTS

| | | |
|---|---|---|
| 8,366,005 B2 | 2/2013 | Kotlarsky et al. |
| 8,371,507 B2 | 2/2013 | Haggerty et al. |
| 8,376,233 B2 | 2/2013 | Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,736,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Bremer et al. |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |

(56) References Cited

U.S. PATENT DOCUMENTS

| | | | |
|---|---|---|---|
| 8,976,368 B2 | 3/2015 | Akel et al. | |
| 8,978,981 B2 | 3/2015 | Guan | |
| 8,978,983 B2 | 3/2015 | Bremer et al. | |
| 8,978,984 B2 | 3/2015 | Hennick et al. | |
| 8,985,456 B2 | 3/2015 | Zhu et al. | |
| 8,985,457 B2 | 3/2015 | Soule et al. | |
| 8,985,459 B2 | 3/2015 | Kearney et al. | |
| 8,985,461 B2 | 3/2015 | Gelay et al. | |
| 8,988,578 B2 | 3/2015 | Showering | |
| 8,988,590 B2 | 3/2015 | Gillet et al. | |
| 8,991,704 B2 | 3/2015 | Hopper et al. | |
| 8,996,194 B2 | 3/2015 | Davis et al. | |
| 8,996,384 B2 | 3/2015 | Funyak et al. | |
| 8,998,091 B2 | 4/2015 | Edmonds et al. | |
| 9,002,641 B2 | 4/2015 | Showering | |
| 9,007,368 B2 | 4/2015 | Laffargue et al. | |
| 9,010,641 B2 | 4/2015 | Qu et al. | |
| 9,015,513 B2 | 4/2015 | Murawski et al. | |
| 9,016,576 B2 | 4/2015 | Brady et al. | |
| D730,357 S | 5/2015 | Fitch et al. | |
| 9,022,288 B2 | 5/2015 | Nahill et al. | |
| 9,030,964 B2 | 5/2015 | Essinger et al. | |
| 9,033,240 B2 | 5/2015 | Smith et al. | |
| 9,033,242 B2 | 5/2015 | Gillet et al. | |
| 9,036,054 B2 | 5/2015 | Koziol et al. | |
| 9,037,344 B2 | 5/2015 | Chamberlin | |
| 9,038,911 B2 | 5/2015 | Xian et al. | |
| 9,038,915 B2 | 5/2015 | Smith | |
| D730,901 S | 6/2015 | Oberpriller et al. | |
| D730,902 S | 6/2015 | Fitch et al. | |
| D733,112 S | 6/2015 | Chaney et al. | |
| 9,047,098 B2 | 6/2015 | Barten | |
| 9,047,359 B2 | 6/2015 | Caballero et al. | |
| 9,047,420 B2 | 6/2015 | Caballero | |
| 9,047,525 B2 | 6/2015 | Barber | |
| 9,047,531 B2 | 6/2015 | Showering et al. | |
| 9,049,640 B2 | 6/2015 | Wang et al. | |
| 9,053,055 B2 | 6/2015 | Caballero | |
| 9,053,378 B1 | 6/2015 | Hou et al. | |
| 9,053,380 B2 | 6/2015 | Xian et al. | |
| 9,057,641 B2 | 6/2015 | Amundsen et al. | |
| 9,058,526 B2 | 6/2015 | Powilleit | |
| 9,064,165 B2 | 6/2015 | Havens et al. | |
| 9,064,167 B2 | 6/2015 | Xian et al. | |
| 9,064,168 B2 | 6/2015 | Todeschini et al. | |
| 9,064,254 B2 | 6/2015 | Todeschini et al. | |
| 9,066,032 B2 | 6/2015 | Wang | |
| 9,070,032 B2 | 6/2015 | Corcoran | |
| D734,339 S | 7/2015 | Zhou et al. | |
| D734,751 S | 7/2015 | Oberpriller et al. | |
| 9,082,023 B2 | 7/2015 | Feng et al. | |
| 9,224,022 B2 | 12/2015 | Ackley et al. | |
| 9,224,027 B2 | 12/2015 | Van Horn et al. | |
| D747,321 S | 1/2016 | London et al. | |
| 9,230,140 B1 | 1/2016 | Ackley | |
| 9,443,123 B2 | 1/2016 | Hejl | |
| 9,250,712 B1 | 2/2016 | Todeschini | |
| 9,258,033 B2 | 2/2016 | Showering | |
| 9,262,633 B1 | 2/2016 | Todeschini et al. | |
| 9,310,609 B2 | 4/2016 | Rueblinger et al. | |
| D757,009 S | 5/2016 | Oberpriller et al. | |
| 9,342,724 B2 | 5/2016 | McCloskey | |
| 9,375,945 B1 | 6/2016 | Bowles | |
| D760,719 S | 7/2016 | Zhou et al. | |
| 9,390,596 B1 | 7/2016 | Todeschini | |
| D762,604 S | 8/2016 | Fitch et al. | |
| D762,647 S | 8/2016 | Fitch et al. | |
| 9,412,242 B2 | 8/2016 | Van Horn et al. | |
| D766,244 S | 9/2016 | Zhou et al. | |
| 9,443,222 B2 | 9/2016 | Singel et al. | |
| 9,462,109 B1* | 10/2016 | Frazier Fields | H04M 1/6066 |
| 9,478,113 B2 | 10/2016 | Xie et al. | |
| 2004/0203384 A1* | 10/2004 | Sugikawa | H04W 12/06 |
| | | | 455/41.2 |
| 2007/0063048 A1 | 3/2007 | Havens et al. | |
| 2008/0090520 A1* | 4/2008 | Camp | H04B 5/00 |
| | | | 455/41.2 |
| 2009/0134221 A1 | 5/2009 | Zhu et al. | |
| 2010/0177076 A1 | 7/2010 | Essinger et al. | |
| 2010/0177080 A1 | 7/2010 | Essinger et al. | |
| 2010/0177707 A1 | 7/2010 | Essinger et al. | |
| 2010/0177749 A1 | 7/2010 | Essinger et al. | |
| 2011/0169999 A1 | 7/2011 | Grunow et al. | |
| 2011/0202554 A1 | 8/2011 | Powilleit et al. | |
| 2012/0111946 A1 | 5/2012 | Golant | |
| 2012/0168512 A1 | 7/2012 | Kotlarsky et al. | |
| 2012/0171958 A1* | 7/2012 | Cornett | H04W 4/008 |
| | | | 455/41.2 |
| 2012/0193423 A1 | 8/2012 | Samek | |
| 2012/0203647 A1 | 8/2012 | Smith | |
| 2012/0223141 A1 | 9/2012 | Good et al. | |
| 2013/0043312 A1 | 2/2013 | Van Horn | |
| 2013/0075168 A1 | 3/2013 | Amundsen et al. | |
| 2013/0175341 A1 | 7/2013 | Kearney et al. | |
| 2013/0175343 A1 | 7/2013 | Good | |
| 2013/0257744 A1 | 10/2013 | Daghigh et al. | |
| 2013/0257759 A1 | 10/2013 | Daghigh | |
| 2013/0270346 A1 | 10/2013 | Xian et al. | |
| 2013/0287258 A1 | 10/2013 | Kearney | |
| 2013/0292475 A1 | 11/2013 | Kotlarsky et al. | |
| 2013/0292477 A1 | 11/2013 | Hennick et al. | |
| 2013/0293539 A1 | 11/2013 | Hunt et al. | |
| 2013/0293540 A1 | 11/2013 | Laffargue et al. | |
| 2013/0306728 A1 | 11/2013 | Thuries et al. | |
| 2013/0306731 A1 | 11/2013 | Pedraro | |
| 2013/0307964 A1 | 11/2013 | Bremer et al. | |
| 2013/0308625 A1 | 11/2013 | Corcoran | |
| 2013/0313324 A1 | 11/2013 | Koziol et al. | |
| 2013/0313325 A1 | 11/2013 | Wilz et al. | |
| 2013/0342717 A1 | 12/2013 | Havens et al. | |
| 2014/0001267 A1 | 1/2014 | Giordano et al. | |
| 2014/0002828 A1 | 1/2014 | Laffargue et al. | |
| 2014/0008439 A1 | 1/2014 | Wang | |
| 2014/0025584 A1 | 1/2014 | Liu et al. | |
| 2014/0034734 A1 | 2/2014 | Sauerwein | |
| 2014/0036848 A1 | 2/2014 | Pease et al. | |
| 2014/0039693 A1 | 2/2014 | Havens et al. | |
| 2014/0042814 A1 | 2/2014 | Kather et al. | |
| 2014/0049120 A1 | 2/2014 | Kohtz et al. | |
| 2014/0049635 A1 | 2/2014 | Laffargue et al. | |
| 2014/0061306 A1 | 3/2014 | Wu et al. | |
| 2014/0063289 A1 | 3/2014 | Hussey et al. | |
| 2014/0066136 A1 | 3/2014 | Sauerwein et al. | |
| 2014/0067692 A1 | 3/2014 | Ye et al. | |
| 2014/0070005 A1 | 3/2014 | Nahill et al. | |
| 2014/0071840 A1 | 3/2014 | Venancio | |
| 2014/0074746 A1 | 3/2014 | Wang | |
| 2014/0076974 A1 | 3/2014 | Havens et al. | |
| 2014/0078341 A1 | 3/2014 | Havens et al. | |
| 2014/0078342 A1 | 3/2014 | Li et al. | |
| 2014/0078345 A1 | 3/2014 | Showering | |
| 2014/0098792 A1 | 4/2014 | Wang et al. | |
| 2014/0100774 A1 | 4/2014 | Showering | |
| 2014/0100813 A1 | 4/2014 | Showering | |
| 2014/0103115 A1 | 4/2014 | Meier et al. | |
| 2014/0104413 A1 | 4/2014 | McCloskey et al. | |
| 2014/0104414 A1 | 4/2014 | McCloskey et al. | |
| 2014/0104416 A1 | 4/2014 | Li et al. | |
| 2014/0104451 A1 | 4/2014 | Todeschini et al. | |
| 2014/0106594 A1 | 4/2014 | Skvoretz | |
| 2014/0106725 A1 | 4/2014 | Sauerwein | |
| 2014/0108010 A1 | 4/2014 | Maltseff et al. | |
| 2014/0108402 A1 | 4/2014 | Gomez et al. | |
| 2014/0108682 A1 | 4/2014 | Caballero | |
| 2014/0110485 A1 | 4/2014 | Toa et al. | |
| 2014/0114530 A1 | 4/2014 | Fitch et al. | |
| 2014/0121438 A1 | 5/2014 | Kearny | |
| 2014/0121445 A1 | 5/2014 | Ding et al. | |
| 2014/0124577 A1 | 5/2014 | Wang et al. | |
| 2014/0124579 A1 | 5/2014 | Ding | |
| 2014/0125842 A1 | 5/2014 | Winegar | |
| 2014/0125853 A1 | 5/2014 | Wang | |
| 2014/0125999 A1 | 5/2014 | Longacre et al. | |
| 2014/0129378 A1 | 5/2014 | Richardson | |

(56) References Cited

U.S. PATENT DOCUMENTS

| | | |
|---|---|---|
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158767 A1* | 6/2014 | Ramaci ............... G06K 7/084 235/449 |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0323048 A1* | 10/2014 | Kang ............... H04W 76/023 455/41.2 |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0223272 A1* | 8/2015 | Parkinson ........... G10L 19/0017 455/41.2 |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0105924 A1* | 4/2016 | Baek ................... H04W 4/008 455/41.2 |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0125873 A1 | 7/2016 | Braho et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |

OTHER PUBLICATIONS

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 44 pages.

(56) References Cited

OTHER PUBLICATIONS

U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages; now abandoned.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/704,050 for Intermediate Linear Positioning filed May 5, 2015 (Charpentier et al.); 60 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/735,717 for Indicia-Reading Systems Having an Interface With a User'S Nervous System filed Jun. 10, 2015 (Todeschini); 39 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/747,197 for Optical Pattern Projector filed Jun. 23, 2015 (Thuries et al.); 33 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/740,373 for Calibrating a Volume Dimensioner filed Jun. 16, 2015 (Ackley et al.); 63 pages.
U.S. Appl. No. 13/367,978, filed Feb. 7, 2012, (Feng et al.); now abandoned.
U.S. Appl. No. 14/277,337 for Multipurpose Optical Reader, filed May 14, 2014 (Jovanovski et al.); 59 pages; now abandoned.
U.S. Appl. No. 14/446,391 for Multifunction Point of Sale Apparatus With Optical Signature Capture filed Jul. 30, 2014 (Good et al.); 37 pages; now abandoned.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 29/528,890 for Mobile Computer Housing filed Jun. 2, 2015 (Fitch et al.); 61 pages.
U.S. Appl. No. 29/526,918 for Charging Base filed May 14, 2015 (Fitch et al.); 10 pages.

* cited by examiner

EXAMPLE PROCESS 20:

COMMUNICATING AN EXCHANGE OF DATA SIGNALS BETWEEN MULTIPLE
ENTITIES OVER A COMMUNICATION NETWORK

EXCHANGE A FIRST PORTION OF THE DATA SIGNALS, BASED ON A COMMUNICATION PROFILE,
BETWEEN A FIRST ENTITY AND ONE OR MORE ENTITIES COMMUNICATIVELY COUPLED WITH THE
FIRST ENTITY OVER A FIRST CHANNEL OF THE COMMUNICATION NETWORK
21

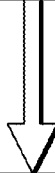

EXCHANGE A SECOND PORTION OF THE DATA SIGNALS, INDEPENDENT OF THE COMMUNICATION
PROFILE, BETWEEN THE FIRST ENTITY AND AT LEAST ONE OF THE ONE OR MORE ENTITIES OVER AN
AT LEAST SECOND CHANNEL OF THE COMMUNICATION NETWORK
22

FIG. 2

EXTENDED FEATURES FOR NETWORK COMMUNICATION

TECHNOLOGY FIELD

The present invention relates generally to communication. More particularly, example embodiments of the present invention relate to communicating over a data network.

BACKGROUND

Generally speaking, wireless communication allows two or more distinct devices, which are separated spatially from each other, to exchange data signals independent of wireline based transmission media, such as coaxial cables, optical fiber, or telephone conductors. The independence from the wireline transmission media, provides utility and convenience, and may reduce costs in relation to the wireline media.

The wireless data signals may comprise electromagnetic energy exchanged over a radio frequency (RF) spectral band between a transmitter device and a receiver device. "Transceivers" comprise devices operable as both a transmitter (Tx) and a receiver (Rx). Wireless data exchange is a feature of various contemporary network applications.

For example, a device related network ("device network") may be established, which allows multiple communicative computing and peripheral devices associated with a user or enterprise to exchange data signals. Thus, intrapersonal or intra-enterprise data may be exchanged wirelessly over the DEVICE NETWORK between a computing device, such as a user's telephone, and a peripheral device, such as a head set.

Wireless data exchanges may occur between communicatively compatible devices based on one or more communication profiles, definitions, protocols, specifications, and/or standards (collectively, "profiles") promulgated by various technical, telecommunication, and/or industrial authorities. In some applications, situations may arise in which it may be useful to exchange data wirelessly between devices that communicate based apart from a profile, or based on separate profiles.

It could be useful, therefore, to provide for a wireless data exchange between devices according to a given communication profile that has widespread compatibility and allows for hand-free operation. It could also be useful to provide for a wireless data exchange, relating to an application running on one of the devices, with one or more other devices. Further, it could be useful for the wireless data exchange relating to the application to be communicated between the devices apart from, or outside of the given profile.

SUMMARY

Accordingly, in one aspect, an example embodiment of the present invention relates to providing for a wireless data exchange between devices according to a given communication profile, such as the Bluetooth Hand-Free Profile (HFP), which has widespread compatibility and allows for hand-free operation. Example embodiments also provide for a wireless data exchange, relating to an application running on one of the devices, with one or more other devices. Example embodiments, further, provide for the wireless data exchange relating to the application to be communicated between the devices independent of the HFP or other given profile.

Example embodiments of the present invention relate to systems, methods, and networks for communicating an exchange of data signals between multiple entities. The network comprises two or more channels.

An example embodiment of the present invention relates to a system for the communication of the exchange of data signals over the network. A first channel of the network is operable for exchanging a first portion of the data signals, based on a communication profile, between a first entity and one or more entities communicatively coupled with the first entity. At least a second channel of the network is operable for exchanging a second portion of the data signals, independent of the communication profile, between the first entity and at least one of the one or more entities.

The system may be operable for performing a process for communicating an exchange of data signals between the plurality of entities over the communication network. An example embodiment of the present invention relates to a method for the communication of the exchange of data signals over the network.

An example embodiment of the present invention relates to a non-transitory computer-readable storage medium. The non-transitory storage medium comprises instructions. The instructions are stored physically as a tangible feature of a component of the medium. The instructions are operable, upon execution by one or more computer processors, for causing, configuring, controlling, or programming a performance of a method for communicating an exchange of data signals between a plurality of entities over a communication network, such as the example method, summarized above.

While providing the convenience and compatibility of communicating data exchanges, e.g., hands-free in accordance with the HFP, example embodiments of the present invention also provide for data flows independent of (e.g., outside of, apart from) the HFP specification. Peripheral devices such as headsets may communicate the first data portion in accordance with the HFP and thus achieve wide compatibility and interoperability. However, example embodiments of the present invention provide additional or extended functionality in communicating data related to specific applications or other software stored and running on audio gateway (AG) devices, and exchanged between the AG devices and peripheral devices (e.g., audio headsets) or other entities communicatively coupled therewith.

The foregoing illustrative summary, as well as other example features, functions and/or aspects of embodiments of the invention, and the manner in which the same are accomplished, are further explained within the following detailed description of example embodiments and each figure ("FIG.") of the accompanying drawings.

BRIEF DESCRIPTION OF THE DRAWINGS

FIG. 2 depicts a flowchart of an example process for exchanging data signals, according to an embodiment of the present invention.

DESCRIPTION OF EXAMPLE EMBODIMENTS

Figure 1:
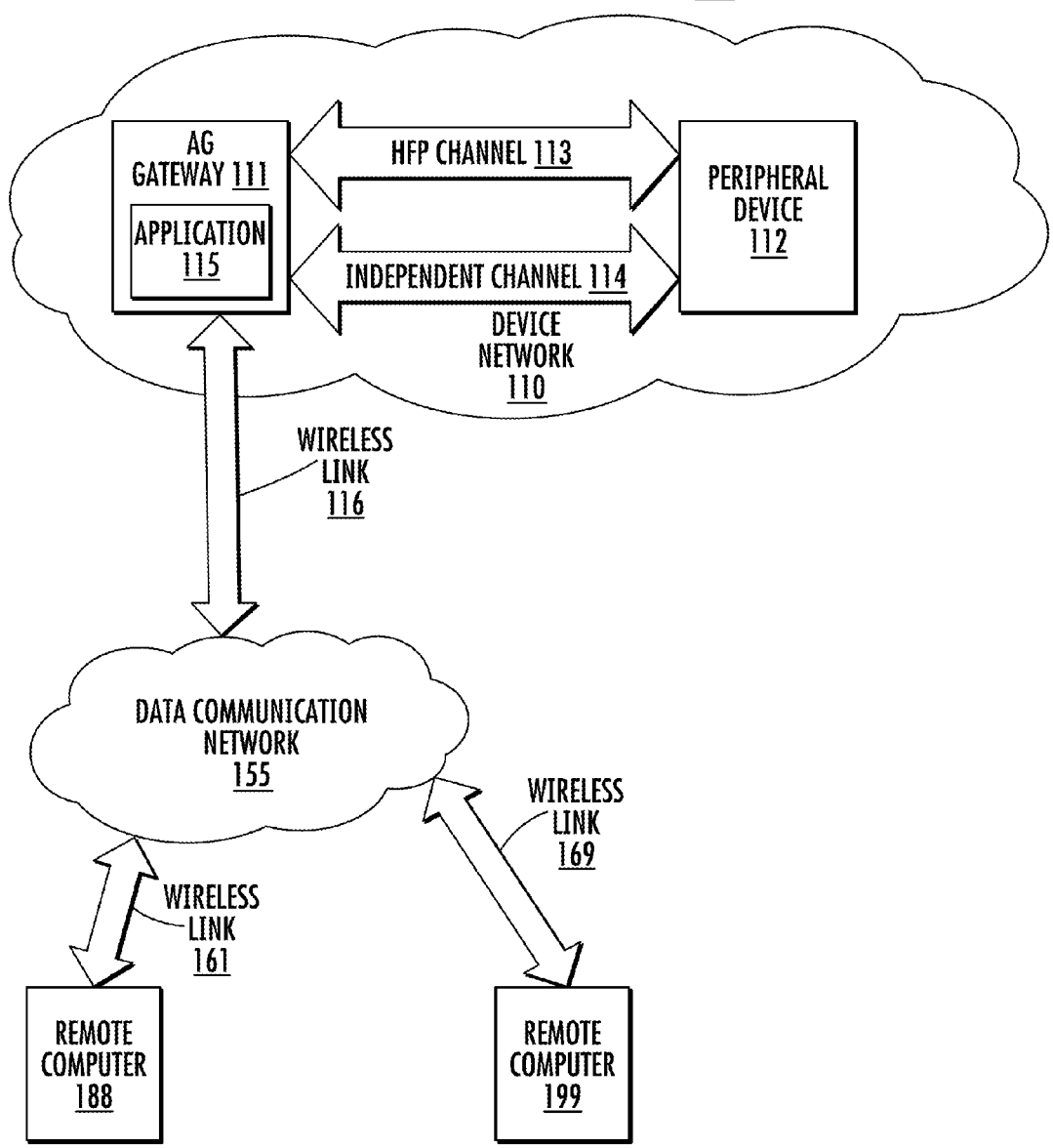
FIG. 1 depicts an example system for exchanging data signals, according to an embodiment of the present invention.

Example embodiments of the present invention are described in relation to systems, methods, and networks for communicating an exchange of data signals between multiple entities. The network comprises two or more channels.

Overview.

Example embodiments of the present invention relate to systems, methods, and networks for communicating an exchange of data signals between multiple entities. The network comprises two or more channels.

An example embodiment of the present invention relates to a system for the communication of the exchange of data signals over the network. A first channel of the network is operable for exchanging a first portion of the data signals, based on a communication profile, between a first entity and one or more entities communicatively coupled with the first entity. At least a second channel of the network is operable for exchanging a second portion of the data signals, independent of the communication profile, between the first entity and at least one of the one or more entities.

The network is operable for the communicating of the data signals over at least one radio frequency (RF) spectral band. The at least one RF spectral band may comprise a Bluetooth RF band, a frequency of between approximately 2.4 Gigahertz (GHz) and 2.485 GHz, inclusive, and/or a frequency corresponding to an instrumentation, scientific, and medical (ISM) band of the RF spectrum.

The network may comprise a wireless device network. The device network may comprise an audio gateway (AG) device, such as a radiotelephone or mobile computing device. The device network may also comprise a peripheral device, such as an audio headset, or one or more other mobile devices or other computer related entities.

In an example embodiment, the exchange of a first portion of the data is communicated over a first channel of the device network in accordance with a hands-free profile (HFP), such as may be related to Bluetooth communication networks. The HFP defines a specific set of commands to transfer data between a peripheral, such as a Bluetooth headset (as well as one or more mobile devices or other computer related entities), and the AG device, which is communicatively compatible therewith.

The AG device may comprise an application stored physically on a non-transitory computer readable storage medium. The application is operable for performing one or more computer related process functions using the AG device. In an example embodiment, the exchange of a second portion of the data is communicated over a second channel of the device network independent of the HFP.

The second portion of the data signals may relate, specifically, to at least one application associated with the first entity. The second portion of the data signals may relate to, for example, a status associated with a link related to one or more of the network, the first channel, or the second channel. The link may comprise a Bluetooth link. The second portion of the data signals may comprise data related to, for example, a capacity level associated with a power supply, such as a battery, which is related to the first entity and the at least second entity.

The second portion of the data signals may also relate to a reading associated with a temperature, pressure, or other ambient, component related, or environmental characteristic. The second portion of the data signals may comprise data related to, for example, a diagnostic message.

Further, the second portion of the data signals may relate to, for example, a pedometer and/or measuring wheel readout. The data signals may relate to, for example, a location, such as a set of geopositioning coordinates (e.g., longitude, latitude, altitude, etc.). The data signals may relate to, for example, a characteristic related to motion, such as may correspond to (a) signal(s) generated by a microelectromechanical system (MEMS), and/or devices such as an accelerometer, speedometer, gyroscope or gyrocompass, altimeter, synchro or servomechanism, and/or a detector of vibration and/or shock.

The data signals may relate to, for example, a disposition of a microphone and/or a position of a microphone boom. The second portion of the data signals may comprise data related to, for example, an audio signal related to, e.g., an identity, authority, and/or characteristic of one or more human voices or other sounds.

The system may be operable for performing a process, a method for communicating an exchange of data signals between the plurality of entities over the communication network. An example embodiment of the present invention relates to a method for the communication of the exchange of data signals over the network.

In an example embodiment of the present invention, a first portion of the data signals is exchanged based on a communication profile such as the HFP, between a first entity such as the AG, and one or more entities, such as a headset, communicatively coupled with the first entity over a first channel of the communication network. A second portion of the data signals is exchanged, independent of the communication profile, between the first entity and at least one of the one or more entities over an at least second channel of the communication network.

An example embodiment of the present invention relates to a non-transitory computer-readable storage medium. The non-transitory storage medium comprises instructions. The instructions are stored physically (e.g., optically, electronically, electromagnetically, electromechanically, magnetically, etc.) as a tangible feature of a component of the medium, such as a state or characteristic of one or more memory cells, mapped portions of an optical or magnetic disk, buffers, registers, latches, caches, etc. The instructions are operable, upon execution by one or more computer processors, for causing, configuring, controlling, or programming a performance of a method for communicating an exchange of data signals between a plurality of entities over a communication network, such as the example method, described herein.

Example embodiments of the present invention thus provide for data flows outside of the HFP or other communication profiles or specifications. While providing the convenience and compatibility of communicating data exchanges, e.g., hands-free in accordance with the HFP, example embodiments of the present invention also provide for data flows independent of (e.g., outside of, apart from) the HFP specification. Peripheral devices such as headsets may communicate the first data portion in accordance with the HFP and thus achieve wide compatibility and interoperability. However, example embodiments of the present invention provide additional or extended functionality in communicating data related to specific applications or other software stored and running on audio gateway (AG) devices, and exchanged between the AG devices and peripheral devices (e.g., audio headsets) or other entities communicatively coupled therewith.

Example System.

An example embodiment of the present invention relates to a system for the communication of the exchange of data signals over the network. FIG. 1 depicts an example system 100 for exchanging data signals embodiment of the present invention. The system 100 comprises a device network 110.

The device network 110 comprises a first entity 111 such as an AG device (e.g., radiotelephone). The device network 110 also comprises at least a second entity 112 such as a peripheral device (e.g., headset). The second entity 112 is communicatively coupled with the first entity 111 via the device network 110. Further, the device network 110 comprises a first communication channel 113, and at least a second communication channel 114.

The first channel 113 of the device network 110 is operable for exchanging a first portion of the data signals, based on a communication profile such as the HFP, between the first entity 111 and one or more entities communicatively coupled with the first entity 111, including the at least second entity 112. The at least second channel 114 of the device network 110 is operable for exchanging a second portion of the data signals, independent of the communication profile, between the first entity 111 and at least one of the one or more entities, such as the second entity 112.

The device network 110 is operable for the communicating of the data signals over at least one RF spectral band. The RF spectral band may comprise a Bluetooth RF band, a frequency of between approximately 2.4 GHz and 2.485 GHz, inclusive, and/or a frequency corresponding to an ISM band of the RF spectrum.

The device network 110 may comprise, and communicatively couple data exchange wirelessly an AG device, such as a radiotelephone or mobile computing device, with a peripheral device, such as an audio headset, and/or other computer and/or communicating entities. In an example embodiment, the exchange of a first portion of the data is communicated over a first channel of the device network in accordance with the HFP. An example embodiment may be implemented in which the HFP comprises a Bluetooth related HFP.

The AG device may comprise at least one application 115 stored physically on a non-transitory computer readable storage medium. The at least one application 115 is operable for performing one or more computer related process functions using the AG device 111. In an example embodiment, the exchange of a second portion of the data is communicated over a second channel 114 of the device network 110. The second channel 114 is operable for communicating the second data portion independent of the HFP, and may be referred to herein as an "independent channel."

The second portion of the data signals may relate, specifically, to the at least one application 115. The second portion of the data signals may relate to, for example, a status associated with a link related to one or more of the device network 110 or another network. For example, the data may relate to a wireless link 116 between the first entity 111 and a data communication network 155, the HFP channel 113, and/or the independent channel 114.

The link may comprise a Bluetooth link. The second portion of the data signals may comprise data related to, for example, a capacity level associated with a power supply, such as a battery, which is related to the first entity and the at least second entity.

The data communication network 155 may comprise a telephone network, a packet-switched data network, or other communication network operable for exchanging data between entities communicatively coupled over the network. Any number (e.g., one or more) of remote mobile devices, represented herein by remote computer 188 and remote computer 199, may be communicatively coupled with the AG 111 over the data communication network 155. The remote computer 188 is coupled communicatively with the network 155 over a wireless link 161. The remote computer 199 is coupled communicatively with the network 155 over a wireless link 169. The AG 111 and the remote computers 188, 199, etc. may comprise radiotelephones, pad style and/or laptop computers, or any other mobile device or other computer related entity.

The data communications network 155 and the RF links 161 and 169 may be operable over one or more radiotelephone frequency bands and using code-division multiple access (CDMA), Global System for Mobile (GSM), time-division multiple access (TDMA), frequency-division multiple access (FDMA), and/or other modulation approaches. In contrast, the device network 115 is operable using the Bluetooth link and at a frequency of approximately 2.4 GHz to 2.485 GHz in an ISM band of the RF spectrum.

The second portion of the data signals may also comprise data related to a reading associated with a temperature, pressure, or other ambient, component related, or environmental characteristic. The second portion of the data signals may comprise data related to, for example, a diagnostic message.

Further, the second portion of the data signals may comprise data related to, for example, a pedometer, and/or measuring wheel readout. The data signals may relate to, for example, a location, such as a set of geopositioning coordinates (e.g., longitude, latitude, altitude, etc.). The data signals may relate to, for example, a characteristic related to motion, such as may correspond to (a) signal(s) generated by a microelectromechanical system (MEMS), and/or devices such as an accelerometer, speedometer, gyroscope or gyrocompass, altimeter, synchro or servomechanism, and/or a detector of vibration and/or shock.

The data signals may relate to, for example, a disposition of a microphone and/or a position of a microphone boom. The second portion of the data signals may comprise data related to, for example, an audio signal related to, e.g., an identity, authority, and/or characteristic of one or more human voices or other sounds.

While providing the convenience and compatibility of communicating data exchanges, e.g., hands-free in accordance with the HFP, example embodiments of the present invention also provide for data flows independent of (e.g., outside of, apart from) the HFP specification. Peripheral devices such as headsets may communicate the first data portion in accordance with the HFP and thus achieve wide compatibility and interoperability. However, example embodiments of the present invention provide additional or extended functionality in communicating data related to specific applications or other software stored and running on audio gateway (AG) devices, and exchanged between the AG devices and peripheral devices (e.g., audio headsets) or other entities communicatively coupled therewith.

An example embodiment may be implemented in which the second entity 112 (e.g., headset) provides a second channel with which it may exchange data communications with the AG device 111. Upon establishment of communication between the second entity 112 (e.g., peripheral device, headset) and the first entity (e.g., AG 111), the application 115 and/or other specific processes or software running on the AG 111 may send and receive data with the peripheral.

The second channel 114 may comprise a set of transport protocols, which may relate to serial port emulation and/or logical link control and adaptation (L2CAP). The second channel 114 may comprise a Bluetooth RFCOMM channel. The second channel 114 may be operable in accordance with the TS-07.10 Standard of the European Telecommunications Standards Institute (ETSI), or a standard promulgated, established, or set forth by another telecommunications, technical, and/or industrial standardizing authority not dissimilar, substantively, thereto.

An example embodiment may be implemented in which the second entity 112 (e.g., headset) is compliant with the 'Made for iPhone, iPod, iPad' (MFi) licensing program of Apple™, Inc., a corporation in California. With the MFi compliant peripheral device 112 and an AG device 111 specific (or substantively similar) to an Apple™ mobile device such as an iPad™, iPhone™, or iPod™, the second channel 114 may comprise an 'iAP2' (iPod™ Accessory Protocol Version 2) link established over the Bluetooth network pathway.

The system 100 may be operable for performing a process for communicating an exchange of data signals between the plurality of entities over the communication network 115.

Example Method.

An example embodiment of the present invention relates to a method for the communication of the exchange of data signals over the network. FIG. 2 depicts a flowchart of an example process 20 for exchanging data signals, according to an embodiment of the present invention.

In step 21, a first portion of the data signals is exchanged based on a communication profile such as the HFP, between a first entity such as the AG, and one or more entities, such as a headset, communicatively coupled with the first entity over a first channel of the communication network.

In step 22, a second portion of the data signals is exchanged, independent of the communication profile, between the first entity and at least one of the one or more entities over an at least second channel of the communication network.

An example embodiment of the present invention relates to a non-transitory computer-readable storage medium. The non-transitory storage medium comprises instructions. The instructions are stored physically (e.g., optically, electronically, electromagnetically, electromechanically, magnetically, etc.) as a tangible feature of a component of the medium, such as a state or characteristic of one or more memory cells, mapped portions of an optical or magnetic disk, buffers, registers, latches, caches, etc. The instructions are operable, upon execution by one or more computer processors, for causing, configuring, controlling, or programming a performance of a method for communicating an exchange of data signals between a plurality of entities over a communication network, such as the example method, described herein. The instructions may comprise information stored in relation to the application 115. The instructions may also comprise information stored in relation to the HFP, and to the independent communication profile.

Example Network Environment.

Figure 3:
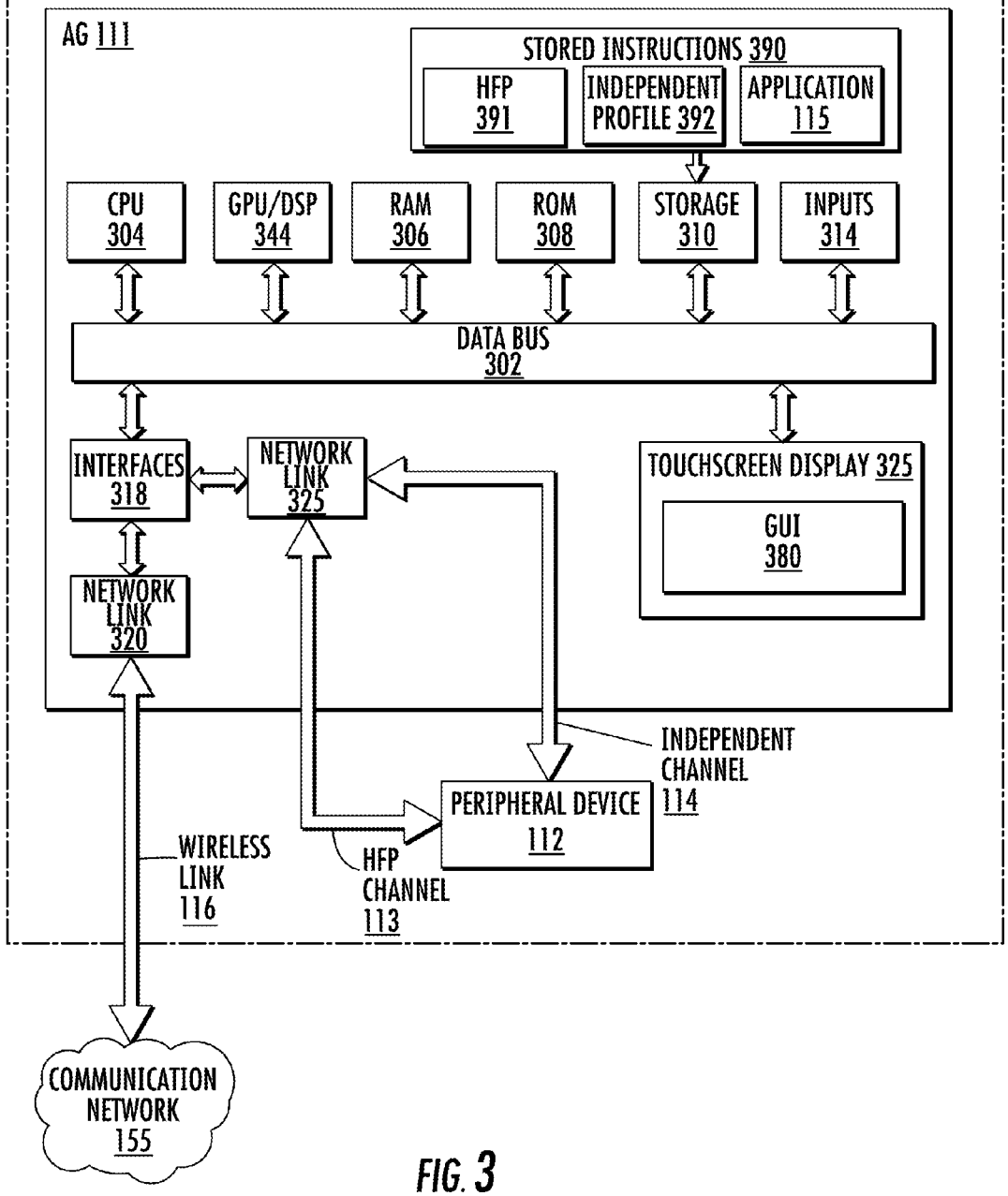
FIG. 3 depicts an example network environment, according to an embodiment of the present invention.

An example embodiment of the present invention relates to a network environment for exchanging data signals between a first entity and one or more second entities. FIG. 3 depicts an example network environment 300, according to an embodiment of the present invention. The network environment 300 comprises the device network 110 and the data communication network 155. The device network 110 comprises the AG device 111 and the peripheral device 112.

The data communication network 155 may comprise a telephone network and/or a packet-switched data network operable based on transfer control and internetworking protocols (e.g., TCP/IP). The data communication network 155 may comprise a portion of one or more other networks and/or two or more sub-network ("subnet") components. For example, the data communication network 155 may comprise a portion of the internet and/or a particular wide area network (WAN). The data communication network 155 may also comprise one or more WAN and/or local area network (LAN) subnet components. Portions of the data communication network 155 may be operable wirelessly and/or with wireline related means. The data communication network 155 may also comprise, at least in part, a communication network such as a digital telephone network.

The AG 111 comprises a plurality of electronic components, each of which is coupled to a data bus 302. The data bus 302 is operable for allowing each of the multiple, various electronic components of the AG 111 to exchange data signals with each of the other electronic components. The peripheral device 112 may also comprise various electronic components.

The electronic components of the AG 111, and the peripheral device 112, may comprise integrated circuit (IC) devices, including one or more microprocessors. The electronic components of the AG 111 and/or the peripheral device 112 may also comprise other IC devices, such as a microcontroller, field-programmable gate array (FPGA) or other programmable logic device (PLD) or application-specific IC (ASIC).

The microprocessors, e.g., of the AG 111, may comprise a central processing unit (CPU) 304. The CPU 304 is operable for performing general data processing functions related to operations of the AG 111. The electronic components of the AG 111 may also comprise one or more other processors 344.

For example, the other microprocessors 344 may comprise a graphics processing unit (GPU) and/or digital signal processor (DSP), which are each operable for performing data processing functions that may be somewhat more specialized than the general processing functions, as well as sometimes sharing some processing functions with the CPU 304.

One of the processors 344 may also be operable as a "math" (mathematics) coprocessor. The math co-processor, DSP and/or GPU ("DSP/GPU") 344 are operable for performing computationally intense data processing. The computationally intense processing may relate to imaging, graphics, control, and other (e.g., mathematical, financial) information.

The data processing operations comprise computations performed electronically by the CPU 304, and the DSP/GPU 344. The microprocessors may comprise components operable as an arithmetic logic unit (ALU), a floating point unit (FPU), and associated memory cells. The memory cells comprise non-transitory data storage media, which may be configured as caches (e.g., "L1," "L2"), registers, latches, and/or buffers, etc.

The memory cells are operable for storing data electronically in relation to various functions of the processors. For example, a translational look-aside buffer (TLB) may be operable for optimizing efficiency of use of content-addressable memory (CAM) by the CPU 304, and/or the DSP/GPU 344, etc.

The AG 111 also comprises non-transitory computer readable storage media operable for storing data, e.g., electronically. For example, the computer readable storage media comprises a main memory 306, such as a random access memory (RAM) or other dynamic storage medium. The main memory 306 is coupled to data bus 302 for storing information and instructions, which are to be executed by the CPU 304.

The main memory 306 may also be used for storing temporary variables or other intermediate information during execution of instructions by the CPU 304. Other memories (represented in the present description with reference to the RAM 306) may be installed for similar uses by the DSP/GPU 344.

The AG 111 further comprises a read-only memory (ROM) 308 or other static storage medium coupled to the data bus 302. The ROM 308 is operable for storing static information and instructions for use by the CPU 304. In addition to the RAM 306 and the ROM 308, the non-transitory storage media may comprise at least one data storage device 310. The data storage device 310 is operable for storing information and instructions and allowing access thereto.

The data storage device 310 may comprise a magnetic disk drive, flash drive, or optical disk drive (or other non-transitory computer readable storage medium). The data storage device 310 comprises non-transitory media coupled to data bus 302, and may be operable for providing a "virtual memory" function. The virtual memory operations of the storage device 310 may supplement, at least temporarily, storage capacity of other non-transitory media, such as the RAM 306.

The non-transitory storage media comprises instructions 390, which are stored (e.g., electronically, magnetically, optically, physically, etc.) in relation to software for programming, controlling, and/or configuring operations of the AG 111 and its components and applications. The instructions 390 may also relate to the performance of one or more steps of the data exchange communication method 20 (FIG. 2).

Instructions, programming, software, settings, values, and configurations, etc. related to the method 20, the system 100 and its components, and other operations of the AG 111 and the peripheral device 112 are stored physically (e.g., magnetically, electronically, optically, etc.) by the storage medium 310, memory, etc., and e.g., not dissimilar, non-transitory storage media of the peripheral 112.

The stored instructions 390 may comprise information related to the application 115. The stored instructions 390 may comprise information 391 related to the HFP, and to the independent communication profile 392.

The AG 111 may comprise a user-interactive display configured as the touchscreen 325, which is operable as a combined display and a graphic user interface (GUI) 380. The touchscreen 325 may comprise a liquid crystal display (LCD), which is operable for rendering images by modulating variable polarization states of an array of liquid crystal transistor components. The GUI 380 comprises an interface, operable over the touchscreen display 325, for receiving haptic inputs from a user of the AG 111.

The haptic interface of the GUI 380 and touchscreen 325 may comprise, e.g., at least two arrays of microscopic (or transparent) conductors, each of which is insulated electrically from the other and disposed beneath a surface of the display 325 in a substantially perpendicular orientation relative to the other. The haptic inputs comprise pressure applied to the surface of the GUI 380 on the touchscreen 325, which cause corresponding local changes in electrical capacitance values proximate to the pressure application that are sensed by the conductor grids. The localized capacitance changes are operable for effectuating a signal corresponding to the input.

The touchscreen 325 may be implemented operably for rendering images over a heightened (e.g., high) dynamic range (HDR). The rendering of the images may also be based on modulating a back-light unit (BLU). For example, the BLU may comprise an array of light emitting diodes (LEDs). The LCDs may be modulated according to a first signal and the LEDs of the BLU may be modulated according to a second signal. The touchscreen 325 may render an HDR image by coordinating the second modulation signal in real time, relative to the first modulation signal.

Other display technologies may also (or alternatively) be used. For example, the display 325 may comprise an organic LED (OLED) array. The display 325 may also (or alternatively) comprise a display operable over a standard dynamic range (SDR), sometimes also referred to as a "low dynamic range" (LDR).

An input receiver 314 may comprise one or more electromechanical switches, which may be implemented as buttons, escutcheons, microelectromechanical sensors (MEMS) or other sensors, dual in-line package (DIP) switches, etc. The input receiver 314 may also comprise cursor and trigger controls such as a mouse, joystick, etc. and/or a keyboard. The keyboard may comprise an array of alphanumeric and/or ideographic, syllabary based keys operable for typing corresponding letters, number, and/or other symbols. The keyboard may also comprise an array of directional (e.g., "up/down," "left/right") keys, operable for communicating commands and data selections to the CPU 304 and for controlling movement of a cursor rendering over the touchscreen display 325.

The directional keys may be operable for presenting two degrees of freedom of a cursor, over at least two perpendicularly disposed axes presented on the display component of the touchscreen 325. A first 'x' axis is disposed horizontally. A second 'y' axis, complimentary to the first axis, is disposed vertically. Thus, the printing evaluation system 300 is thus operable for specifying positions over a representation of a Cartesian geometric plane, and/or other coordinate systems.

Execution of instruction sequences contained in the storage media 310 and main memory 306 cause the CPU 304 to perform processing related to general operations of the AG 111, and the DSP/GPU 344, to perform various other processing operations, including processing steps related to the example method 20 (FIG. 2). Additionally or alternatively, hard-wired circuitry may be used in place of, or in combination with the software instructions. Thus, the AG 111 is not limited to any specific combination of circuitry, hardware, firmware, or software.

The term "computer readable storage medium," as used herein, may refer to any non-transitory storage medium that participates in providing instructions to the various processor components of the AG 111 for execution. Such a medium may take various forms including, but not limited to, non-volatile media, volatile media, and transmission media. Non-volatile media comprises, for example, configured/programmed active elements of the CPU 304, the DSP/GPU 344, stored instructions 390, and other optical, electronic, or magnetic media. Volatile media comprises dynamic memory associated, e.g., with the RAM 306.

Transmission media comprises coaxial cables, copper wire and other electrical conductors and fiber optics, including the wires (and/or other conductors or optics) that comprise the data bus 302.

Transmission media can also take the form of electromagnetic radiation (e.g., light waves), such as may be generated at RF wavelengths, and infrared (IR) and other optical frequencies. Data communications may also be effectuated using other means, including acoustic (e.g., sound related) or other mechanical, vibrational, or phonon related media.

Non-transitory computer-readable storage media may comprise, for example, flash drives such as may be accessible via universal serial bus (USB) or any medium from which the AG 111 can access, read, receive, and retrieve data.

Various forms of non-transitory computer readable storage media may be involved in carrying one or more sequences of one or more instructions to CPU 304 for execution. For example, the instructions may initially be carried on a magnetic or other disk of a remote computer (e.g., computers 188, 199; FIG. 1). The remote computer can load the instructions into its dynamic memory and send the instructions over the network 155.

The AG 111 can receive the data over the network 155 and use an RF, IR, or other transmitter means to convert the data to corresponding signals. An IR, RF or other signal detector or receiver ("receiver") coupled to the data bus 302 can receive the data carried in the corresponding signals and place the data on data bus 302. The operations associated with the transmitter and the receiver may be combined in a transmitter/receiver (transceiver) means. The transmitter, receiver, and/or transceiver means may be associated with the interfaces 318.

The data bus 302 carries the data to main memory 306, from which CPU 304 and the DSP/GPU 344 retrieve and execute the instructions. The instructions received by main memory 306 may optionally be stored on storage device 310 either before or after execution by CPU 304.

The interfaces 318 may comprise a communication interface coupled to the data bus 302. The communication interface 318 is operable for providing a two-way (or more) data communication coupling to a network link 320, which may connect wirelessly over RF to the network 155.

In any implementation, the communication interface 318 sends and receives electrical, electromagnetic, or optical signals that carry digital data streams representing various types of information. The network link 320 provides data communication through the network 155 to other data devices. Wireless communication may also be implemented optically, e.g., at IR frequencies. The interfaces 318 may provide signals to the components of the AG 111 via the network link 320 received over the data communications network 155. The data communications network 155 and the RF links 161 and 169 (FIG. 1) may be operable over one or more radiotelephone frequency bands and using code-division multiple access (CDMA), Global System for Mobile (GSM), time-division multiple access (TDMA), frequency-division multiple access (FDMA), and/or other modulation approaches.

The communication interface 318 is also operable for providing a two-way (or more) data communication coupling to a network link 325, which may connect wirelessly over RF, via the device network 110, to the peripheral device 112. The device network 110 and network link 325 may be operable using the Bluetooth link and at a frequency of approximately 2.4 GHz to 2.485 GHz in an ISM band of the RF spectrum.

An example embodiment may be implemented in which the peripheral device (or other entity) 112 is coupled to the AG 111 over the HFP channel 113 and the second, independent channel 114. The HFP channel 113 supports more routine and hands-free operations. The second, independent channel 114 supports the exchange of data communications with the AG device 111 specific to the application 115. Upon establishment of communication between the second entity 112 (e.g., peripheral device, headset) and the first entity (e.g., AG 111), the application 115 and/or other specific processes or software running on the AG 111 may send and receive data with the peripheral device 112.

The second channel 114 may comprise a set of transport protocols, which may relate to serial port emulation and/or L2CAP. The second channel 114 may comprise a Bluetooth RFCOMM channel. The second channel 114 may be operable in accordance with the TS-07.10 Standard of ETSI, etc.

An example embodiment may be implemented in which the peripheral device 112 (e.g., headset) is compliant with Apple's™ MFi licensing program. With the MFi compliant peripheral device 112 and an AG device 111 specific (or substantively similar) to an Apple™ mobile device, the second channel 114 may comprise an iAP2 link established over the Bluetooth network pathway.

The network 155 and the device network 110 may use one or more of electrical, electromagnetic, and/or optical signals carrying digital data streams. The system 100 can send messages and receive data, including program code, through the network 155, network link 320, and communication interface 318.

* * *

To supplement the present disclosure, this application incorporates entirely by reference the following commonly assigned patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; 702,237; 8,740,082; 8,740,085; 8,746,563; 8,750,445; 8,752,766; 8,756,059; 8,757,495; 8,760,563; 8,763,909; 8,777,108; 8,777,109; 8,779,898; 8,781,520; 8,783,573; 8,789,757; 8,789,758; 8,789,759; 8,794,520; 8,794,522; 8,794,525; 8,794,526; 8,798,367; 8,807,431; 8,807,432; 8,820,630; 8,822,848; 8,824,692; 8,824,696; 8,842,849; 8,844,822; 8,844,823; 8,849,019; 8,851,383; 8,854,633; 8,866,963; 8,868,421; 8,868,519; 8,868,802; 8,868,803; 8,870,074; 8,879,639; 8,880,426; 8,881,983; 8,881,987; 8,903,172; 8,908,995; 8,910,870; 8,910,875; 8,914,290; 8,914,788; 8,915,439; 8,915,444; 8,916,789; 8,918,250; 8,918,564; 8,925,818; 8,939,374; 8,942,480; 8,944,313; 8,944,327; 8,944,332; 8,950,678; 8,967,468; 8,971,346; 8,976,030; 8,976,368; 8,978,981; 8,978,983; 8,978,984; 8,985,456; 8,985,457; 8,985,459; 8,985,461; 8,988,578; 8,988,590; 8,991,704; 8,996,194; 8,996,384; 9,002,641; 9,007,368; 9,010,641; 9,015,513; 9,016,576; 9,022,288; 9,030,964; 9,033,240; 9,033,242; 9,036,054; 9,037,344; 9,038,911; 9,038,915; 9,047,098; 9,047,359; 9,047,420; 9,047,525; 9,047,531; 9,053,055; 9,053,378; 9,053,380; 9,058,526; 9,064,165; 9,064,167; 9,064,168; 9,064,254; 9,066,032; 9,070,032;

U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;

U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;

U.S. patent Application Ser. No. 13/367,978 for a *Laser Scanning Module Employing an Elastomeric U-Hinge Based Laser Scanning Assembly*, filed Feb. 7, 2012 (Feng et al.);
U.S. patent application Ser. No. 29/458,405 for an *Electronic Device*, filed Jun. 19, 2013 (Fitch et al.);
U.S. patent application Ser. No. 29/459,620 for an *Electronic Device Enclosure*, filed Jul. 2, 2013 (London et al.);
U.S. patent application Ser. No. 29/468,118 for an *Electronic Device Case*, filed Sep. 26, 2013 (Oberpriller et al.);
U.S. patent application Ser. No. 14/150,393 for *Indicia-reader Having Unitary Construction Scanner*, filed Jan. 8, 2014 (Colavito et al.);
U.S. patent application Ser. No. 14/200,405 for *Indicia Reader for Size-Limited Applications* filed Mar. 7, 2014 (Feng et al.);
U.S. patent application Ser. No. 14/231,898 for *Hand-Mounted Indicia-Reading Device with Finger Motion Triggering* filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for *Docking System and Method Using Near Field Communication* filed Apr. 21, 2014 (Showering);
U.S. patent application Ser. No. 14/264,173 for *Autofocus Lens System for Indicia Readers* filed Apr. 29, 2014 (Ackley et al.);
U.S. patent application Ser. No. 14/277,337 for MULTI-PURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HAND-HELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTOCONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

* * *

Example embodiments of the present invention are thus described in relation to systems, methods, and networks for communicating an exchange of data signals between multiple entities. The network comprises two or more channels.

An example embodiment of the present invention relates to a system for the communication of the exchange of data signals over the network. A first channel of the network is operable for exchanging a first portion of the data signals, based on a communication profile, between a first entity and one or more entities communicatively coupled with the first entity. At least a second channel of the network is operable for exchanging a second portion of the data signals, independent of the communication profile, between the first entity and at least one of the one or more entities. Example embodiments also relate to methods, networks, and non-transitory computer readable storage media.

While providing the convenience and compatibility of communicating data exchanges, e.g., hands-free in accordance with the HFP, example embodiments of the present invention also provide for data flows independent of (e.g., outside of, apart from) the HFP specification. Peripheral devices such as headsets may communicate the first data portion in accordance with the HFP and thus achieve wide compatibility and interoperability. However, example embodiments of the present invention provide additional or extended functionality in communicating data related to specific applications or other software stored and running on audio gateway (AG) devices, and exchanged between the AG devices and peripheral devices (e.g., audio headsets) or other entities communicatively coupled therewith.

For clarity and brevity, as well as to avoid unnecessary or unhelpful obfuscating, obscuring, obstructing, or occluding features of an example embodiment, certain intricacies and details, which are known generally to artisans of ordinary skill in related technologies, may have been omitted or discussed in less than exhaustive detail. Any such omissions or discussions are neither necessary for describing example embodiments of the invention, nor particularly relevant to understanding of significant elements, features, functions, and aspects of the example embodiments described herein.

In the specification and/or figures, typical embodiments of the invention have been disclosed. The present invention is not limited to such example embodiments. The use of the term "and/or" includes any and all combinations of one or more of the associated listed items, and the term "or" is used in an inclusive (and not exclusive) sense. The figures are schematic representations and so are not necessarily drawn to scale. Unless otherwise noted, specific terms have been used in a generic and descriptive sense and not for purposes of limitation.

What is claimed is:

1. A system that exchanges data signals between a plurality of entities over a network, the system comprising:
a first channel that exchanges a first portion of the data signals, based on a communication profile, between an audio gateway (AG) device and one or more entities communicatively coupled with the AG device at least a second channel that exchanges a second portion of the data signals, independent of the communication profile, between the (AG) device and at least one of the one or more entities; and at least one application associated with the AG device that implements the exchange of the second portion of the data signals, wherein the second portion of the data signals comprise one or more of a capacity level associated with a power supply related to the AG device and the at least one entity, a temperature reading, a pedometer or measuring wheel readout, and a microphone disposition or microphone boom position;

wherein the first and second portions of the data signals are communicated over a single radio frequency (RF) spectral band via Bluetooth communication.

2. The system as described in claim 1 wherein the RF spectral band is:

a Bluetooth RF band;

a frequency of between approximately 2.4 Gigahertz (GHz) and 2.485 GHz, inclusive; or a frequency corresponding to an instrumentation, scientific, and medical (ISM) RF band.

3. The system as described in claim 1 wherein the communication profile comprises a hands-free profile (HFP).

4. The system as described in claim 3 wherein the HFP comprises a Bluetooth related HFP.

5. The system as described in claim 1 wherein the at least one application is operable for performing at least one process function on at least one of the AG device or the at least one entity.

6. The system as described in claim 1 wherein the at least one entity comprises one or more of a peripheral device, or an audio headset.

7. A method for exchanging data signals between a plurality of entities over a communication network, the method comprising the steps of:

exchanging a first portion of the data signals, based on a communication profile, between an audio gateway (AG) device and one or more entities communicatively coupled with the AG device over a first channel of the communication network; and exchanging, via at least one application associated with the AG device, a second portion of the data signals, independent of the communication profile, between the AG device and at least one of the one or more entities over an at least second channel of the communication network, the second portion of the data signals comprising one or more of a capacity level associated with a power supply related to the AG device and the at least one entity, a temperature reading, a pedometer or measuring wheel readout, and a microphone disposition or microphone boom position;

wherein the first and second portions of the data signals are communicated over a single frequency (RF) spectral band via Bluetooth communication.

8. The method as described in claim 7 wherein the RF spectral band is:

a Bluetooth RF band;

a frequency of between approximately 2.4 Gigahertz (GHz) and 2.485 GHz, inclusive; or a frequency corresponding to an instrumentation, scientific, and medical (ISM) RF band.

9. The method as described in claim 7 wherein the communication profile comprises a hands-free profile (HFP).

10. The method as described in claim 9 wherein the HFP comprises a Bluetooth related HFP.

11. The method as described in claim 7 wherein the at least one application is operable for performing at least one process function on at least one of the AG device or the at least one entity.

12. The method as described in claim 7 wherein the step of exchanging the second portion of the data signals, independent of the communication profile, between the AG device and the at least one of the one or more entities over the at least second channel of the communication network comprises exchanging the second portion of the data signals between the audio gateway (AG) device and at least one of a peripheral device, or an audio headset.

13. A non-transitory computer-readable storage medium comprising instructions, which when executing on one or more computer processors, are operable for causing, configuring, controlling, or programming a performance of a method for exchanging data signals between a plurality of entities over a communication network, the method comprising the steps of:

exchanging a first portion of the data signals, based on a communication profile, between an audio gateway (AG) device and one or more entities communicatively coupled with the AG device over a first channel of the communication network; and exchanging a second portion of the data signals, independent of the communication profile, between the AG device and at least one of the one or more entities over an at least second channel of the communication network, the second portion of the data signals comprising one or more of a capacity level associated with a power supply related to the AG device and the at least one entity, a temperature reading, one or more of a pedometer or measuring wheel readout, and a microphone disposition or microphone boom position;

wherein the first and second portions of the data signals are communicated over a single radio frequency (RF) spectral band via Bluetooth communication.

* * * * *